United States Patent [19]
Phipps

[11] 3,865,710
[45] Feb. 11, 1975

[54] PURIFICATION CONTROL UNIT
[75] Inventor: Richard John Phipps, Newbury, England
[73] Assignee: Camper & Nicholsons (Holdings) Limited, Gosport, England
[22] Filed: Feb. 26, 1973
[21] Appl. No.: 335,952

[30] Foreign Application Priority Data
Mar. 7, 1972 Great Britain.................... 10464/72
July 19, 1972 Great Britain.................... 33666/72

[52] U.S. Cl................. 204/228, 204/152, 204/276, 204/DIG. 9, 307/39, 323/24, 323/25
[51] Int. Cl. .......................... B01k 3/00, H02j 3/14
[58] Field of Search ...... 204/228, DIG. 9, 275, 276, 204/149, 152, 229; 323/23, 24, 25, 19, 22 SC; 307/12, 33, 34, 38, 39

[56] References Cited
UNITED STATES PATENTS
| 3,637,482 | 1/1972 | Vajda................... | 204/228 |
| 3,758,399 | 9/1973 | Pendergrass........... | 204/228 |
| 3,767,046 | 10/1973 | Hartkorn.............. | 204/152 X |
| 3,769,196 | 10/1973 | Wikey.................. | 204/275 |

FOREIGN PATENTS OR APPLICATIONS
116,308 1/1958 U.S.S.R................. 204/228

Primary Examiner—John H. Mack
Assistant Examiner—D. R. Valentine
Attorney, Agent, or Firm—Christie, Parker & Hale

[57] ABSTRACT
A control circuit, particularly for use in a water purification circuit, in which a multivibrator circuit is controlled to reverse periodically the d.c. polarity of output terminals of the circuit across which a water purification cell may be connected.

9 Claims, 4 Drawing Figures

3,865,710

PURIFICATION CONTROL UNIT

This invention relates to control circuits and is particularly concerned with an electronic control circuit for use with a water purifier.

In many circumstances it would be desirable to use for human consumption a water supply that is "clean" in the sense of not requiring filtering but whose bacteriological condition is unknown and therefore potentially dangerous. It is desirable to have for use in such circumstances an inexpensive and reliable water purifier, and it is an object of this invention to provide a control circuit for use with such a purifier.

In the case of a swimming pool purification system, however, filtration is required. It is, therefore, an additional object of the present invention to provide a control circuit that caters for filtration as well as purification.

Broadly, the present invention is a control circuit having a pair of supply terminals, a pair of d.c. output terminals, and a multivibrator circuit and circuit means controlling the operation of the multivibrator circuit coupled between the supply and output terminals, the arrangement being such that a change in state of the multivibrator reverses the polarity of the output terminals.

According to important distinguishing features of one embodiment, there are provided not merely a single pair of output terminals but rather first and second pairs of unidirectional output terminals to which there are supplied purification and coagulation currents respectively. Both pairs of output terminals are interconnected with the supply terminals by a network that includes controlled rectifiers. Also, the polarity of both pairs of output terminals is reversed upon a change in state of the multivibrator circuit.

An embodiment of the present invention will now be described, by way of example, with reference to the accompanying drawings, in which.

Figure 1:
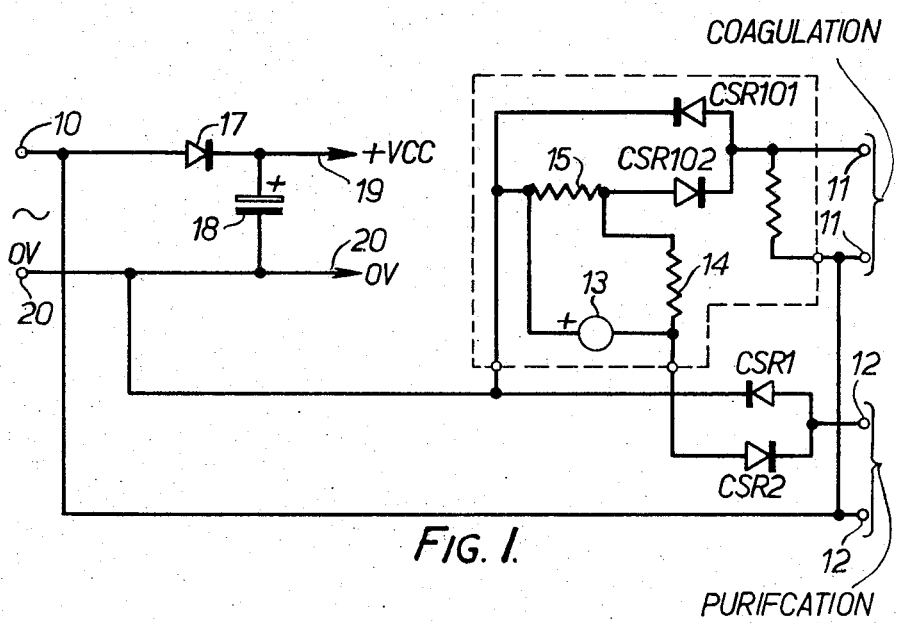
FIG. 1 is a circuit diagram of a control circuit according to the present invention for a water purification and filtration system, showing the connection of controlled rectifiers between a.c. input terminals and two pairs of d.c. output terminals.

The control circuit illustrated in FIG. 1 of the drawings is specifically intended to control the operation of a swimming pool purification system, the system requiring two unidirectional pulsed supplies for two sets of electrodes, one of said sets serving to coagulate impurities in the water prior to filtering while the other serves to purify the water after filtering. However, while the invention will be described in this specific context it will be understood that it is equally useful in other contexts.

Referring now to FIG. 1, a control circuit is provided with a pair of input terminals 10 and 20, to which a 16 volt a.c. supply may be connected, and two pairs of output terminals 11 and 12 for coagulation and purification respectively. Connected between the terminals 20 and 12 are a parallel pair of oppositely poled, controlled silicon rectifiers CSR 1 and CSR 2, and a second parallel pair of oppositely poled controlled silicon rectifiers CSR 101 and CSR 102 is connected between the terminals 20 and 11. A voltmeter 13 is connected across resistors 14 and 15 connected in the anode circuits of the rectifiers CSR 2 and CSR 102 respectively to indicate current flow in the coagulation and purification systems. As will be explained hereinafter, only one of these currents is measured by the meter 13 at any one time and it should be noted that as the current required for coagulation is some thirty times that required for purification, the resistor 14 has a correspondingly greater resistance than the resistor 15.

Figure 2:
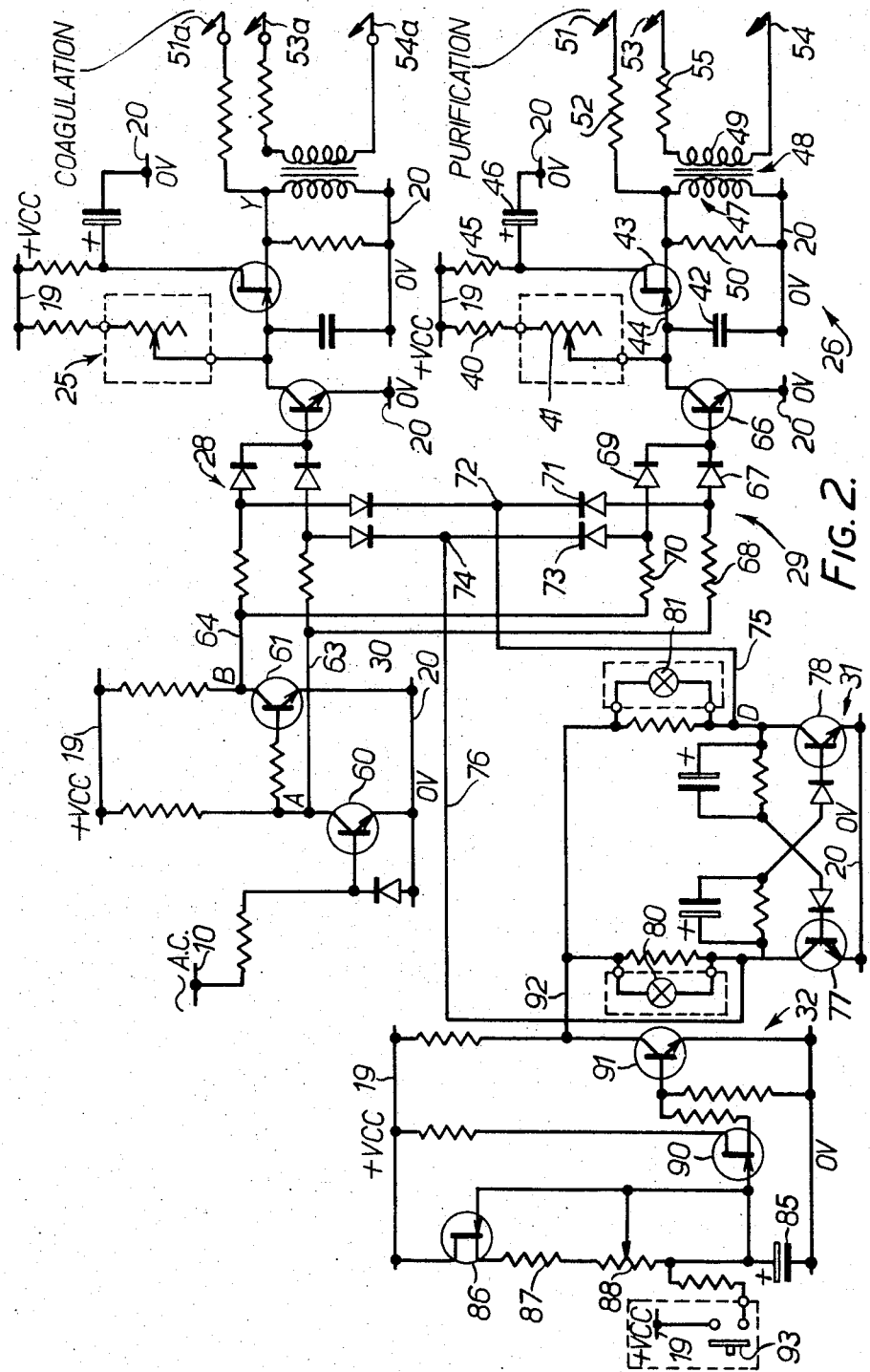
FIG. 2 is a circuit diagram of the means for controlling the firing of the rectifiers of FIG. 1.

Also shown in FIG. 1 is a series rectifier 17 and a parallel capacitor 18 to provide from the terminals 10 a d.c. supply at terminals 19 and 20 for the circuits of FIG. 2 which control the firing of the rectifiers of FIG. 1.

Referring now to FIG. 2, trigger pulse generators 25 and 26 are provided for the coagulation and purification rectifiers respectively. The trigger pulse generators 25 and 26 are both connected through respective polarity selection circuits 28 and 29 to a squarer and inverter circuit 30 and to a polarity switching or change over circuit 31. A timer circuit 32 is connected with and controls the operation of the polarity change over circuit 31.

The trigger pulse generators 25 and 26 are identical so only one, generator 26, will be described in detail. The generator 26 consists of a timing circuit, a unijunction transistor and an atput circuit. The timing circuit consists of the series connection of a resistor 40, a variable resistor 41 and a capacitor 42 between the terminals 19 and 20 (FIG. 1). The unijunction transistor 43 has one base connected to the terminal 19 through a resistor 45 and to the terminal 20 through a capacitor 46, and its other base connected to the terminal 20 through the primary winding 47 of a transformer 48 forming part of the output circuit of the generator. The emitter 44 of the transistor is connected to the junction of resistor 41 and capacitor 42. The rest of the output circuit comprises a resistor 50 shunting the primary winding 47 of the transformer 48, a first output terminal 51 connected through a resistor 52 to the other base of the transistor 43, and second and third output terminals 53 and 54 connected through a resistor 55 to the ends of the secondary winding 49 of the transformer 48. The terminal 51 is connected to the gate of rectifier CSR 1 (FIG. 1) and the terminals 53 and 54 are respectively connected to the gate and the cathode of the rectifier CSR 2. The corresponding terminals 51a, 53a and 54a of the generator 25 are respectively connected to the gate of the rectifier CSR 101, and the gate and cathode of the rectifier CSR 102.

Considering now the operation of the generator 26, and similarly the operation of the generator 25, it is apparent that the timing circuit serves to charge the capacitor 42 at a rate determined by the setting of the variable resistor 41. Upon reaching a critical voltage on the capacitor 42, the transistor 43 becomes conductive the capacitor 42 discharges through the winding 47 and produces positive pulses between terminals 51 and 20 and between 53 and 54 i.e. pulses which tend to trigger the rectifiers CSR 1 and CSR 2. It is the function of the rest of the circuitry of FIG. 2 to control these pulses from the generators to fire the correct rectifiers of FIG. 1.

Figure 3:
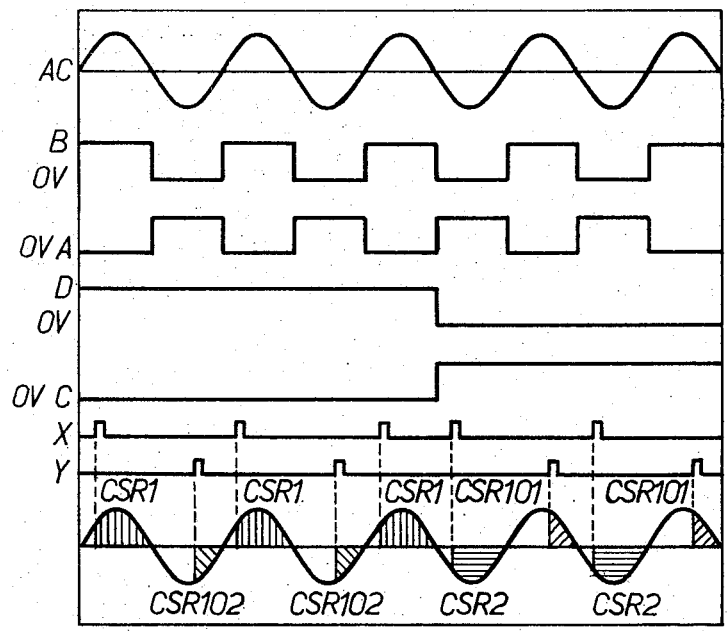
FIG. 3 shows the waveforms at various points in the circuits of FIGS. 1 and 2.

Consider now the circuit 30. This consists of two transistors 60 and 61 connected in common emitter configuration with associated load and bias resistors as a two stage amplifier. Outputs are taken from the collectors of the two transistors 60 and 61 on lines 63 and 64 respectively. In FIG. 3 the waveforms A and B respectively illustrate the outputs on lines 63 and 64 relative to the input waveform on terminals 10. Lines 63 and 64 are connected to both the polarity selection circuits 28 and 29. Circuit 30 together with the polarity selection circuits 28 and 29 form logic means correlating the output of the circuit 31 with the a.c. input.

The selection circuit 29, circuit 28 being identical, consists of a transistor 66 having its collector connected to the emitter 44 of the transistor 43, its emitter connected to the terminal 20 and its base connected back to the lines 63 and 64 through parallel circuits consisting respectively of a series connected diode 67 and a resistor 68, and a series connected diode 69 and a resistor 70, both diodes 67 and 69 having their cathodes connected to the transistor base. The junction point between the diode 67 and the resistor 6 is connected through a diode 71 to a common point 72 between the circuits 28 and 29, and the junction point between the diode 69 and the resistor 70 is connected through a diode 73 to a second common point 74.

The common points 72 and 74 are connected through lines 75 and 76 respectively to the outputs of the polarity change over circuit 31. The circuit 31 is basically a bistable circuit having transistors 77 and 78, and the signals on the lines 76 and 75 are shown respectively by the waveforms C and D of FIG. 3. Pilot lamps 80 and 81 for coagulation and purification respectively are connected in the collector circuits of the transistors 77 and 78 respectively.

The circuit 31 is triggered by the timer circuit 32. In the circuit 32 timing is achieved by means of a capacitor 85 charged from a constant current source comprising a field effect transistor 86 and the series connection of a resistor 87 and a potentiometer 88, the tap on the latter being connected to the emitter of the transistor 86 and to the junction between the capacitor 85 and the potentiometer 88. A unijunction transistor 90 senses the voltage on the capacitor and, when conductive, discharges the capacitor 85 to energise a transistor 91 to provide on the output line 92 a trigger pulse to the circuit 31. A push button 93 connecting the terminal 19 through a resistor to the emitter of the transistor 90 is also provided.

As previously indicated, the control circuit illustrated in the drawings is for use with sets of electrodes in a water purifying system, and it is desired to reverse periodically, for example every eight minutes, the current flow. Thus the timer circuit times out the desired period and triggers the circuit 31 which thus changes its outputs once every eight minutes.

Consider now the operation of the circuit 29, assuming as shown in FIG. 3 that the signal in line 75 is positive and that on line 76 is zero. Transistor 66 will be switched off when no positive signal is applied to its base. In the first positive half cycle of the supply voltage as shown in FIG. 3, lines 63 and 76 are zero and lines 64 and 75 are positive. The positive signal on line 64 leaks through diode 73 and does not reach the base of transistor 66. Also the positive signal on line 75 is blocked by the diode 71. Thus in the first half cycle of the supply transistor 66 is biased off, permitting the generator 26 to develop an output pulse (see waveform x of FIG. 3) as previously described. This applies a trigger pulse to the rectifiers CSR 1 and CSR 2 but only the rectifier CSR 1 switches on as the supply is on a positive half cycle. Rectifier CSR 1 remains conducting for the remainder of the positive half cycle. During the negative half cycle, the positive signal on line 63 is available at the base of the transistor 66 rendering it conducting so that the capacitor 42 cannot charge and no trigger pulse can be developed by the generator 26.

Thus with a positive output from the circuit 31 on line 75, the rectifier CSR 1 is triggered every positive half cycle of the supply, giving a unidirectional "positive" pulsed current flow for purification. Similarly it can be shown that the rectifier CSR 102 is triggered every negative half cycle of the supply (see waveform y of FIG. 3) to provide a unidirectional "negative" pulsed current flow for coagulation. The currents can, of course, be controlled as by adjusting the variable resistor 41 to vary the charging time of the capacitor 42 and thus the phase angle of the half cycle at which the rectifier CSR 1 is triggered.

As previously mentioned, the timer circuit 32 triggers the circuit 31 every eight minutes to change the output on the lines 75 and 76 as shown by the change in the waveforms C and D in FIG. 3. This change results in the generator 26 providing a trigger pulse (waveform x in FIG. 3) every negative half cycle of supply, rendering the rectifier CSR 2 conductive, and in the generator 25 providing a trigger pulse (waveform y in FIG. 3) every positive half cycle of supply rendering the rectifier CSR 101 conductive.

Thus the purification current is now "negative" and the coagulation current is positive, and polarisation of the sets of electrodes is avoided.

Referring to FIG. 1, it has previously been mentioned that the meter 13 measures the current through either CSR 2 or CSR 102. In the first eight minute period, i.e. waveform D high and C low, only CSR 102 is conducting and therefore the coagulation current is measured by the meter. During the second eight minute period CSR 2 is conducting and therefore the purification current is being measured. Of course a person wishing to read the current requires to know which current is being metered, this information being provided by the pilot lights 80 and 81. In the first period transistor 77 is conducting and therefore lamp 80 is lit correctly indicating that the coagulation current is being measured. In the second period, of course, the lamp 81 is lit.

It may be however that a person requires to know the current that is not being metered. Rather than wait until the end of an 8 minute period, he may operate the push button 93 to charge the capacitor 85 immediately and cause the timer circuit 32 to trigger a change in the state of the circuit 31.

Figure 4:
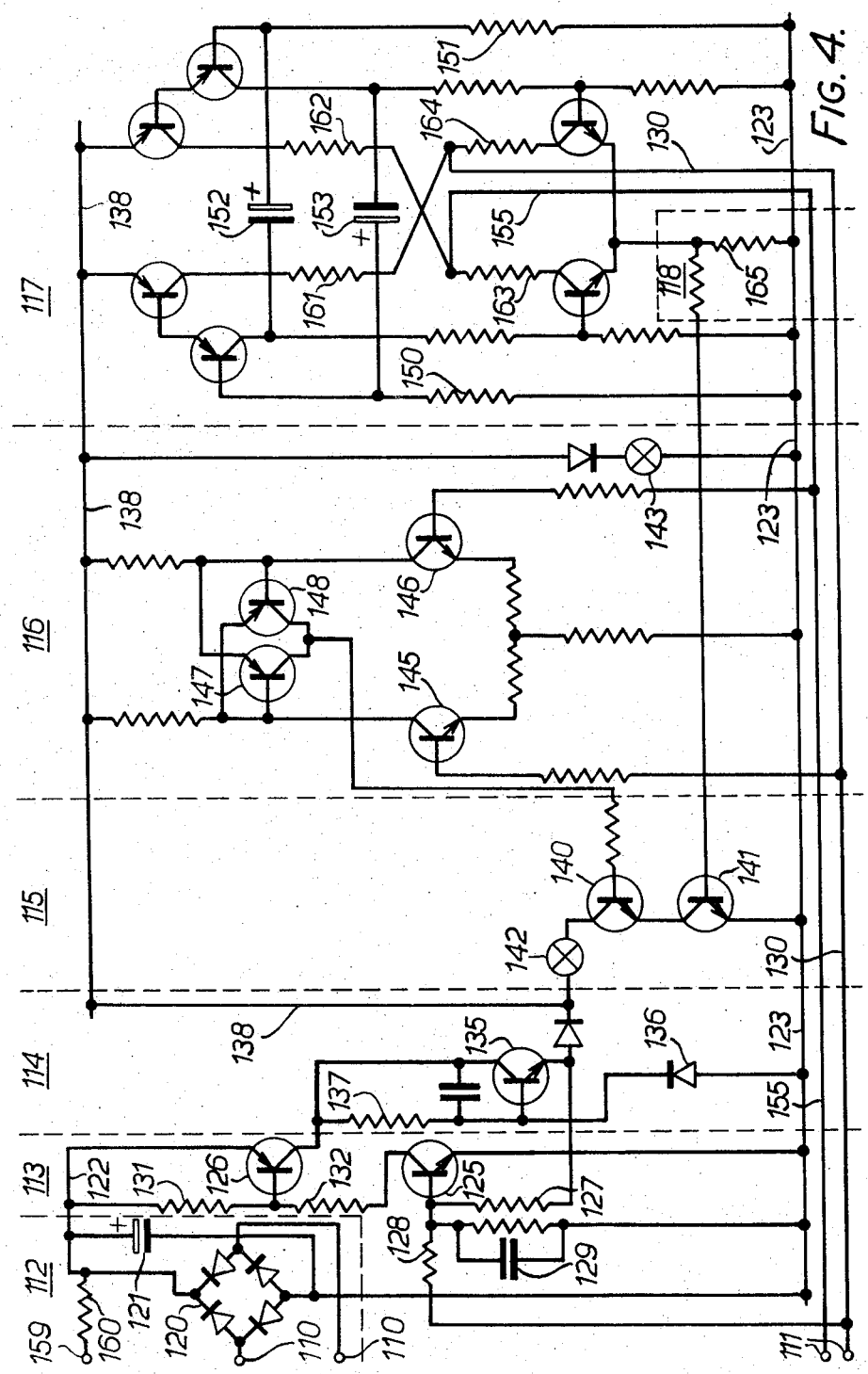
FIG. 4 is a circuit diagram of a control circuit for a water purification only.

FIG. 4 of the drawings shows a simpler control circuit for use in circumstances where only water purification is required. The water purifier unit with which the control circuit of FIG. 4 is intended for use consists of a battery of five plates of pure silver which are spaced apart in parallel planes along a common axis. Alternate plates are electrically interconnected three plates being connected as one pole and two as another. Each pair of plate faces forms an electrolytic cell and, when current is supplied, silver ions are liberated and taken into the water flowing through the unit. The silver ions have a germicidal effect and attenuate the bacteria level in the treated water. The silver ion concentration is suppressed to a safe level by the presence of chloride ions in the water so that excess currents are safe. In practice the plate assembly is mounted in a pipe of an electrically non-conducting material, such as p.v.c. for convenient fitting into a water supply pipe.

Referring now to the drawing, a control circuit for the water purifier unit has a pair of a.c. input terminals 110 nd a pair of d.c. output terminals 111 across which the purifier unit is to be connected. Connected between the two pairs of terminals are a rectifier circuit 112, an automatic switch 113, a power regulator 114, a gate circuit 115, a low cell resistance detector circuit 116, a very low frequency alternating current source 117, and a high cell resistance detector 118.

The rectifier circuit 112 is a conventional four diode full wave bridge rectifier circuit 120 with a smoothing capacitor 121 coupled between the output positive and negative d.c. lines 122 and 123 respectively.

The automatic switch 113 includes two transistors 125 and 126 with associated bias resistors. The NPN transistor 125 is connected in series with the resistors 131 and 132 across the d.c. lines 122 and 123 and its base is connected to the junction between two resistors 127 and 128, the former, in parallel with a capacitor 129, leading to the negative d.c. line 123 and the latter leading to a conductor 130 connected to one of the d.c. terminals 111. The PNP transistor 126 has its base connected to the junction of resistors 131 and 132, which are connected in series between the d.c. line 122 and the collector of the transistor 125, its emitter connected directly to the d.c. line 122, and its collector connected into the power regulator 114. A sensing current for the automatic switch 113 is provided by a probe 159 in the cell connected to the line 122 through a resistor 160.

The power regulator 114 comprises an NPN transistor 135 having its collector connected to the collector of the transistor 126 and being operated in the emitter-follower mode, a zener diode 136 and a resistor 137 acting as a voltage reference source. The output from the regulator is supplied on a conductor 138 to the circuits 115 and 116, and to the current source 117.

The gate circuit 115 consists of two NPN transistors 140 and 141 having their emitter collector circuits connected in series with a lamp 142 between the lines 138 and 123. The gate circuit 115 functions as an AND gate the input signals being derived from the cell resistance detectors 116 and 118 and applied to the bases of the transistors 140 and 141 respectively.

The low cell resistance detector 116 comprises two NPN transistors 145 and 146 connected in parallel as a differential amplifier across the terminals 111. A further two PNP transistors 147 and 148 are cross connected between the collectors of the transistors 145 and 146, their emitters being connected in common to the base of the transistor 140. A lamp 143 is connected between the lines 138 and 123.

The low frequency alternating current source 117 is an astable multivibrator whose period is measured in seconds and whose timing elements are resistors 150 and 151 and capacitors 152 and 153. The output from the source 117 is supplied via conductors 130 and 155 to the terminals 111 and 155. It should be noted that resistors 161 and 164 act to 'float' the purifier unit at a potential half that of the output of the power regulator 114 giving a common mode reference for the differential amplifier of the detector circuit 116.

The high cell resistance detector 118 comprises a resistor 165 which carries the current flowing through the purifier unit. The voltage developed across the resistor 165 is supplied to the base of the transistor 141.

Consider now the normal operation of the control circuit. Upon energisation, the sensing current flows from the line 122 through the resistor 160, the probe 159, the purifier unit connected across the terminals 111, the conductor 130 and the resistors 128 and 127 to the line 123. This current raises the potential at the base of the transistor 125 so that it begins to conduct, in turn switching on the transistors 126 and 135 to energise, via the conductor 138, the circuit 116 and the current source 117 and resistance detector 118. Energisation is indicated by the lamp 143 and, if the cell resistance is between the limits of the cell resistance detectors 116 and 118, both transistors 140 and 141 are conducting so that the lamp 142 is lit to indicate satisfactory operating conditions in the purifier unit.

Energisation of the alternating current source provides a purifying current to the purifier unit, this current reversing upon changeover of the multivibrator, every five seconds say, to prevent polarisation of the cells of the purifier unit. It should be noted that the sensing current is too small to effect any appreciable polarisation of the cells of the purifier unit. Water flowing through the cells of the purifier unit is purified as previously explained.

The resistance of the cells of the purifier unit is being monitored continuously by the detectors 116 and 118. If the cell resistance increases above the acceptable operating limit, indicating for example, worn plates, the purifying current drops, the voltage across the resistor 165 of the detector 118 falls below the level at which the transistor 141 remains conducting, the transistor 141 switches off and the lamp 142 is extinguished indicating an unsatisfactory operating condition of the purifier unit. Similarly, in normal operation the collector voltages of the transistors 145 and 146 of the differential amplifier of the detector 116 are unbalanced so that either the transistor 148 or the transistor 147 maintains the transistor 140 conducting. If the cell resistance falls, for example as a result of a short circuit, the voltage across the purifier unit falls and the collector voltages of both transistors 145 and 146 become balanced, the transistors 147 and 148 become nonconducting and the transistor 140 is switched off thus extinguishing the lamp 142 to indicate again that unsatisfactory operating conditions prevail.

It should be noted that the sensing current flows through the purifier unit i.e. it requires the presence of water between the plates of the purifier unit. If therefore there is no water present in the purifier unit, the sensing current will not flow, the transistor 125 is switched off and the rest of the circuit is de-energised.

The control circuit described with reference to FIG. 4 is inexpensive and is reliable in use as the conductivity of the electrolytic cells is continuously monitored and in the absence of water the control circuit will be de-energised.

I claim:

1. A water purification control circuit having a pair of supply terminals, first and second pairs of unidirectional output terminals, a network including controlled rectifiers and interconnecting said supply and output terminals for supplying to said first and second pairs of output terminals purification and coagulation currents respectively, a multivibrator circuit connected with said network, and circuit means controlling the operation of the multivibrator circuit, the arrangement being such that a change in state of the multivibrator circuit changes the conducting state of the controlled rectifiers to reverse the polarity of both pairs of the output terminals.

2. A control circuit is claimed in claim 1, including a water purification cell comprising at least one pair of silver electrodes connected across the first pair of output terminals.

3. A control circuit as claimed in claim 2, in which said multivibrator is a bistable multivibrator, and said circuit means includes a timing circuit whose output causes the multivibrator to change state.

4. A control circuit as claimed in claim 1, in which said network includes a pair of controlled rectifiers connected in parallel but with opposite polarity between one of the supply terminals and one of the first pair of output terminals, the state of the multivibrator determining which of the rectifiers may be made conductive, and thereby the polarity of the output terminals.

5. A control circuit as claimed in claim 4, in which said network includes a second pair of controlled rectifiers connected in parallel but with opposite polarity between one of the supply terminals and one of the second pair of output terminals, the state of the multivibrator determining which of the second pair of rectifiers may be made conductive, and thereby the polarity of the second pair of output terminals.

6. A control circuit as claimed in claim 5, in which said second pair of output terminals is connected across a pair of electrodes which serve to coagulate impurities in water between the electrodes.

7. A control circuit as claimed in claim 6, including a logic circuit connected between the output of the multivibrator and the control electrodes of the rectifiers to control the conduction thereof.

8. A control circuit as claimed in claim 7, including means for varying the firing angle of the rectifiers to control thereby the output current or currents.

9. A control circuit as claimed in claim 6, in combination with a water flow path through said coagulating electrodes, a filter and said purification cell.

* * * * *